(12) United States Patent
Watson

(10) Patent No.: US 6,491,751 B1
(45) Date of Patent: *Dec. 10, 2002

(54) METHOD FOR MANUFACTURING CEMENT USING A RAW MATERIAL MIX INCLUDING FINELY GROUND STEEL SLAG

(75) Inventor: Robert C. Watson, Austin, TX (US)

(73) Assignee: Texas Industries, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/320,048

(22) Filed: May 26, 1999

Related U.S. Application Data

(60) Provisional application No. 60/100,815, filed on Sep. 18, 1998.

(51) Int. Cl.$^7$ .................................................. C04B 7/36
(52) U.S. Cl. ....................... 106/756; 106/745; 106/767; 106/791; 106/792
(58) Field of Search ................................ 106/714, 739, 106/745, 767, 789, 756, 791, 792

(56) References Cited

U.S. PATENT DOCUMENTS

| | | | |
|---|---|---|---|
| 530,247 A | 12/1894 | Stein | 106/789 |
| 747,919 A | 12/1903 | Passaw | 106/789 |
| 982,945 A | 1/1911 | Forell | 106/767 |
| 998,358 A | 7/1911 | Lessing | 106/767 |
| 2,600,515 A | 6/1952 | Mooser | 106/767 |
| 3,002,843 A | 10/1961 | Stöcker | 106/97 |

(List continued on next page.)

FOREIGN PATENT DOCUMENTS

| | | | |
|---|---|---|---|
| CA | 646625 | * | 8/1962 |
| CH | 1166462 | * | 12/1997 |
| DE | 2829370 | | 1/1979 |
| DE | 2833857 | | 2/1980 |
| DE | 151150 | | 10/1981 |
| DE | 3036957 A1 | | 4/1982 |

(List continued on next page.)

OTHER PUBLICATIONS

"Enhancement of the Cementitious Properties of Steelmaking Slag" Murphy et al. Can Metall Q 36(5), p. 315–331, 1997.*

"Recycling of Steel Slag as a Cement Additive—The Influence of Composition & Cooling Rate on Structure" Murphy et al. Waste Proc. Recycl. Miner Metal Ind. II Proc Int Symp $2^{nd}$ (1995) 187–203, 1995.*

"Efficient Utilization Technology Converter Steel Slag" Liang et al. Huajing Gongcheng (1996) 14(6) p. 44–46, 1996.*

P. Gooding, P. E. Halstead, "The Early History of Cement in England," Proceedings of the Third International Symposium on the Chemistry of Cement, London, 1952.

F. M. Lea, The Chemistry of Cement and Concrete, 3rd Ed. (No date available).

M. Moranville–Regourd, "Cements Made from Blastfurnace Slag," Lea's Chemistry of Cement and Concrete, 4th Ed. No date available.

(List continued on next page.)

Primary Examiner—Paul Marcantoni
(74) Attorney, Agent, or Firm—Baker Botts L.L.P.

(57) ABSTRACT

A method is provided for manufacturing cement from a raw material mixture which includes finely ground steel slag. Selected quantities of steel slag and other raw materials are mixed with each other and supplied to a raw mill. The steel slag and other raw materials are preferably ground to a fine, dry powder. For some applications, the dry powder is preferably supplied to a blend tank for further mixing to ensure more uniform commingling of the finely ground steel slag with other finely ground raw materials. The fine dry powder may be supplied to a preheat system and then to the feed end of a kiln. Alternatively, the dry powder may be supplied directly to the feed end of a kiln.

16 Claims, 2 Drawing Sheets

U.S. PATENT DOCUMENTS

| | | | |
|---|---|---|---|
| 3,565,648 A | 2/1971 | Mori et al. ................... | 106/89 |
| 3,708,314 A | 1/1973 | Kishida et al. .......... | 106/38.27 |
| 3,798,043 A | 3/1974 | Wallouch ..................... | 106/64 |
| 3,921,717 A | 11/1975 | Danjushevsky et al. .... | 166/292 |
| 4,026,717 A | 5/1977 | Harris et al. ................. | 106/100 |
| 4,054,464 A | 10/1977 | Thorn, Jr. et al. .......... | 106/100 |
| 4,124,404 A | * 11/1978 | Suzuki et al. ............... | 106/767 |
| 4,174,961 A | 11/1979 | Wolfs et al. .................... | 75/30 |
| 4,174,974 A | 11/1979 | Fondriest .................... | 106/103 |
| 4,191,546 A | 3/1980 | Kroyer .......................... | 65/20 |
| 4,242,142 A | 12/1980 | Gee et al. ..................... | 106/97 |
| 4,266,980 A | 5/1981 | Chudo et al. ................. | 106/97 |
| 4,342,598 A | 8/1982 | Kogan ......................... | 106/100 |
| 4,451,295 A | 5/1984 | Sprouse ....................... | 106/89 |
| 4,642,137 A | 2/1987 | Heitzmann et al. .......... | 106/85 |
| 4,652,310 A | 3/1987 | Tormari et al. .............. | 75/256 |
| 4,662,941 A | 5/1987 | Hagerman ................... | 106/89 |
| 4,715,896 A | 12/1987 | Berry ......................... | 106/117 |
| 4,731,120 A | 3/1988 | Tuutti .......................... | 106/97 |
| 4,756,761 A | * 7/1988 | Philip et al. ........... | 106/DIG. 1 |
| 4,875,937 A | 10/1989 | Viles .......................... | 106/104 |
| 4,877,452 A | 10/1989 | Roussel et al. ............... | 106/97 |
| 4,961,787 A | 10/1990 | Majumdar et al. .......... | 106/692 |
| 4,981,519 A | 1/1991 | Fukaya et al. .............. | 106/782 |
| 5,076,851 A | 12/1991 | Skovára et al. ............. | 106/713 |
| 5,084,102 A | 1/1992 | Brouns et al. ............... | 106/707 |
| 5,092,932 A | 3/1992 | Lerke et al. ................. | 106/767 |
| 5,156,676 A | 10/1992 | Garrett et al. ............... | 106/745 |
| 5,284,513 A | 2/1994 | Cowan et al. ............... | 106/790 |
| 5,301,752 A | 4/1994 | Cowan et al. ............... | 166/292 |
| 5,306,344 A | 4/1994 | Gutmann et al. ........... | 106/714 |
| 5,307,876 A | 5/1994 | Cowan et al. ............... | 166/293 |
| 5,309,999 A | 5/1994 | Cowan et al. ............... | 166/293 |
| 5,311,944 A | 5/1994 | Cowan et al. ............... | 166/292 |
| 5,342,445 A | 8/1994 | Kiyomoto et al. .......... | 106/789 |
| 5,372,641 A | 12/1994 | Carpenter .................... | 106/714 |
| 5,374,309 A | 12/1994 | Piniecki ....................... | 106/714 |
| 5,379,840 A | 1/1995 | Cowan et al. ............... | 166/292 |
| 5,393,342 A | 2/1995 | Hooykaas .................... | 106/714 |
| 5,395,443 A | 3/1995 | Hooykaas .................... | 106/789 |
| 5,409,063 A | 4/1995 | Cowan ........................ | 166/293 |
| 5,421,409 A | 6/1995 | Mueller et al. .............. | 166/292 |
| 5,421,880 A | * 6/1995 | Young ......................... | 106/756 |
| 5,478,392 A | 12/1995 | Hooykaas .................... | 106/789 |
| 5,482,549 A | 1/1996 | Blaakmeer et al. ......... | 106/606 |
| 5,494,515 A | 2/1996 | Young ......................... | 106/756 |
| 5,499,677 A | 3/1996 | Cowan ........................ | 166/293 |
| 5,515,921 A | 5/1996 | Cowan et al. ............... | 166/293 |
| 5,516,357 A | 5/1996 | Edlinger et al. .............. | 75/434 |
| 5,547,024 A | 8/1996 | Di Lullo Arias ............ | 166/292 |
| 5,553,670 A | 9/1996 | Cowan ........................ | 166/293 |
| 5,580,379 A | 12/1996 | Cowan ........................ | 106/789 |
| 5,593,493 A | 1/1997 | Krofchak .................... | 106/714 |
| 5,685,903 A | 11/1997 | Stav et al. ................... | 106/735 |
| 5,735,947 A | 4/1998 | Hopkins et al. ............. | 106/714 |
| 5,749,962 A | * 5/1998 | Krofchak .................... | 106/714 |
| 5,944,870 A | * 8/1999 | Edlinger ....................... | 75/434 |
| 5,976,243 A | * 11/1999 | Oates et al. ................. | 106/767 |

FOREIGN PATENT DOCUMENTS

| | | | |
|---|---|---|---|
| DE | 200018 | * | 3/1983 |
| DE | 3609568 | | 9/1987 |
| DE | 3633736 | | 4/1988 |
| EP | 0034690 | | 9/1981 |
| EP | 0162215 | | 11/1985 |
| EP | 0171253 | | 2/1986 |
| EP | 0188618 | | 7/1986 |
| EP | 0312323 | | 4/1989 |
| EP | 0393189 | | 4/1990 |
| EP | 0397862 | | 4/1990 |
| EP | 0375081 | | 6/1990 |
| FR | 1503846 | | 10/1966 |
| FR | 2355785 | | 1/1978 |
| FR | 2480136 | | 10/1981 |
| FR | 2486066 | | 1/1982 |
| FR | 2681592 | | 3/1993 |
| GB | 3294 | * | 11/1907 |
| GB | 4530 | * | 2/1908 |
| GB | 546628 | * | 7/1942 |
| GB | 546629 | * | 7/1942 |
| GB | 2208857 | | 4/1989 |
| GB | 2211182 | | 6/1989 |
| JP | 353139628 | * | 12/1978 |
| JP | 13652 | | 1/2000 |
| JP | 13794 | | 1/2000 |
| JP | 21420 | | 1/2000 |
| JP | 30103 | | 1/2000 |
| JP | 54948 | | 2/2000 |
| JP | 57529 | | 2/2000 |
| JP | 69137 | | 3/2000 |
| JP | 90449 | | 3/2000 |
| JP | 149359 | | 5/2000 |
| JP | 192440 | | 7/2000 |
| JP | 223649 | | 8/2000 |
| JP | 224147 | | 8/2000 |
| JP | 267142 | | 9/2000 |
| PL | 139135 | | 12/1986 |
| RU | 513950 | | 5/1976 |
| RU | 610813 | | 6/1978 |
| RU | 658102 | | 4/1979 |
| RU | 969692 | | 10/1982 |
| RU | 1167164 A | | 7/1985 |
| RU | 1206247 | | 1/1986 |
| SU | 772394 | | 10/1980 |
| SU | 1079624 | | 7/1986 |
| SU | 1608155 | | 11/1990 |
| WO | 8301443 | | 4/1983 |
| WO | 8601795 | | 3/1986 |
| WO | 8904815 | | 6/1989 |
| WO | 9003343 | | 4/1990 |
| WO | 9003344 | | 4/1990 |
| WO | 9104953 | | 4/1991 |
| WO | WO 95/19324 | | 7/1995 |

OTHER PUBLICATIONS

Dr. S. N. Ghosh, Progress in Cement and Concrete, Cement and Concrete Science & Technology, vol. 1, Part I., New Delhi, I. Odler, "Improving Energy Efficiency in Portland Clinker Manufacturing," Cement and Concrete Science & Technology, vol. I, Part I, (1991), pp. 174–200.

M. Regourd, "Slag and Slag Cements," Instructional Modules in Cement Science. (No date available).

Peter C. Hewlett, Lea's Chemistry of Cement and Concrete, 4th Ed. (No date available).

Waldemar A. Klemm, Cementitious Materials: Historical Note, Materials Science of Concrete, pp. 2–26. (No date available).

R. Kondo, M. Daimon, S. Goto, A. Nakamura, T. Kobayashi, "Fuel Economized Ferrite Cement Made from Blastfurnace and Converter Slags," Proceedings of the Fifth Mineral Waste Utilization Symposium (Apr. 13–14, 1976).

N. I. Kogan, Yu G. Ench, E. V. Degtyar, Ya. A. Kogan, A. I. Piven, I. I. Timchenko, "The Use of Waste Slag from the Rustavi Metallurgical Plant in Cement Industry," Proceedings of the Institute Intensifying the Process of Calcining Clinker in Rotary Kilns, No. 88, Moscow, 1986.

N. P. Kogan, O. P. Mchellov–Petrosyan, A. I. Edorov, N. F. Drépin, Intensification of the Process of Producing Cement Clinker By Calcining a Batch Consisting of Independent Starting Physicochemical Systems, Doklady akademii nauk SSSR, vol. 238, No. 2, (1978), pp. 408–410.

H. M. Javoronkov, O. P. Mtchedlov–Petrossian, N. P. Kogan, A. I. Zdorov, Y. G. Ientch, Clinkerization with Low Consumption of Energy During Firing of Mixtures Containing Upground Slag. 8th International Congress on the Chemistry of Cement, vol. 11, 1986, pp. 1–3.

R. Kondo, M. Daimon, M. Asakawa, T. Ito, Iron Cement Made from Blastfurnace and Converter Slags, The Cement Association of Japan, Twenty–Eighth General Meeting—Technical Session, Tokyo, May 1974.

R. Sersale, V. Amicarelli, G. Frigione, P. Uberiaco, "A Study of the Utilization of an Italian Steel Slag," 8th International Congress on the Chemistry of Cement, Rio de Janeiro, 1986.

W. Baoxun, F. Yonghao, "Investigation on the Clinker Formation Process, Using Steel–Slag as a Raw Material," Proceedings of the 1985 Beijing International Symposium on Cement and Concrete, 1985, pp. 248–259.

D. W. Lewis, "Properties and Uses of Iron and Steel Slags," Symposium on Slag, National Institute for Transport and Road Research, South Africa, Feb. 23, 1982.

D. W. Lewis, "Resource Conservation by Use of Iron and Steel Slags," *Extending Aggregate Resources*, ASTM STP 774, American Society for Testing and Materials, 1982, pp. 31–42.

D. G. Montgomery, G. Wang, "Engineering Uses of Steel Slag—a By–Product Material." (No date available).

Wayne S. Adaska, Stewart W. Tresouthick, Presbury B. West, "Solidification and Stabilization of Wastes Using Portland Cement," Portland Cement Association, 1991.

Della M. Roy, Portland Cement: Constitution and Processing: Part 1: Cement Manufacture. (No date available).

J. J. Emery, "Slag Utilization in Pavement Construction," *Extending Aggregate Resources*, American Society for Testing and Materials, 1982.

Chart: National Slag Association, Comparison of Chemical and Physical Properties—Three Types of Steel Slag. (No date available).

George Wang, "Properties and Utilization of Steel Slag in Engineering Applications," a thesis submitted in fulfillment of requirements for Doctor of Philosophy, University of Wollongong, 1992.

"Steel Slag," User Guidelines for Waste and By–Product Materials in Pavement Construction, U. S. Department of Transportation, Publication No. FHWA RD 97–148, Apr. 1998.

W. Watson, O. L. Craddock, "Proportioning of Raw Mixtures," Section IX Cement Chemists' and Works Managers' Handbook, 1962, pp. 68–75.

Portland Cements: Raw Materials and Processes of Manufacture, 1970.

S. H. Kosmatka, W. C. Panarese, Design and Control of Concrete Mixtures, Portland Cement Association Engineering Bulletin, 13th Ed., 1988.

G. W. Josephson, F. Sillers, Jr., D. G. Runner, "Iron Blast–Furnace Slag Production, Processing, Properties, and Uses," U. S. Department of the Interior, Bulletin 479, 1949.

Processed Blast Furnace Slag—The All Purpose Construction Aggregate, National Slag Association. (No date available).

W. Gutt, P. J. Nixon, "Use of Waste Materials in the Construction Industry," Analysis of the RILEM Symposium by Correspondence, 1979, pp. 255, 278–281.

T. M. Barnes, J. M. Strong, "Use of Lime Values in Steelmaking Slag Wastes," Proceedings of the 7th Mineral Waste Utilization Symposium, U. S. Bureau of Mines and IIT Research Institute, Chicago, 1980.

Chart: Nippon Slag Association, Utilization of Ironization and Steel Slag in Japan. (No date available).

O. P. Mchedlov–Petrosyan, N. P. Kogan, A. I. Zdorov, "Coarse–Grained Slags as an Additional Constituent of the Cement Raw Mix," Col'loque International Sur Les Laitiers et Cimenta Aux Ajouts, 1981.

A. H. Feiser, "Slag and Slag Cement Practices in Japan," International Conference on Slag and Blended Cements, University of Alabama in Birmingham School of Engineering, 1982.

Slag Utilization Manual, China Steel Corp., pp. 1–10. (No date available).

J. Geiseler, "Steel Slag—Generation, Processing and Utilization," International Symposium on Research Conservation and Environmental Technologies in Metallurgical Industries, Toronto, 1994, pp. 87–97.

B. A. Wills, Mineral Processing Technology, 4th Ed., 1988, pp. 201–212.

A. C. Broughton, "Scrap Tires: a burning issue," *Recycling Today*, Aug. 1993.

T. Gray, "Tire Derived Fuel: An Environmentally Friendly Resource," Rubber Recycling Symposium, 74th Annual Meeting of the Rubber Association, Toronto, Mar. 3, 1994.

J. Skalny, S. Mindess, Materials Science of Concrete II, The American Ceramic Society, Inc., 1991.

S. I. Ivanschenko, et al., Eng., "Utilizing Copper Smeltery Slag as Mineral Additive," NIITsement, Nizhnetagilsky tsementny zavod, 1979.

J. Piret, A. Dralants, "Utilizing LD–Slag for the Production of Portland Cement Clinker and Pig Iron," *Journal of Manufacture and Processing of Iron and Steel*, 16/84, 1984.

Prof. W. Kuredovski, Dr. of Eng., Krystyna Wieja, Mgr. Eng., "Sinterability of Raw Material Compositions Including Blast Furnace Slag," *Cement Lime Gypsum*, Nov.–Dec. 1989.

R. Dogadzhiska, V. Vylkov, I. Vylkova, B. Vylkov, L. Gigova, "Use of Slag From Kremikovtsy Metal Works for the Production of Portland Cement Clinker," Bulgaria, NIISSM, VkhTI, Sofia. (No date available).

I. P. Kogan, O. P. Mchedlov–Petrosyants, A. P. Zdorov, N. F. Drepin, "Intensification of the Process of Preparation of Cement Clinker by Roasting Batch That Consists of Independent Starting Physical and Chemical Systems," USSR Academy of Sciences, 1978, vol. 238, No. 2.

N. M. Zhadvoronokov, O. P. Mchadlov–Petrosyan, K. P. Kogan, A. I. Zdorov, I. G. Yench, Clinker Preparation with Low Energy Consumption by Roasting Mixtures Containing Non–Ground Slag, 8th International Congress on the Chemistry of Cement, USSR Academy of Sciences, Rio de Janeiro, 1986.

J. M. Levert, Y. Riquier, C. Gohy, "Utilizing LD Slag in the Manufacture of Portland Cement," Conference on Slag and Cement with Additives, Belgium, 1981.

V. S. Gorshkov, S. E. Alexandrov, S. I. Ivashchenko, I. V. Gorshkova, "Complex Processing and Use of Metallurgical Slags in Construction Industry," Moscow, Strojlzdat Publishers, 1985.

P. P. Gaidzhurov, V. L. Bernshtein, M. R. Zlatokrylov, "Study on the Formation and Properties of Cement Clinker Produced on the Basis of Converter Slags," *Chemistry and Chemical Engineering*, vol. 33, Issue 3, Ivanovo,, 1990.

F. Puertas, J. Soria, M. T. Blanco–Varela, T. Vázquez, "Modification on the Tricalcium Aluminate Phase in Cements by Manganese Substitution," *Cement and Concrete Research,* vol. 18, pp. 837–842, 1988.

S. C. Ahluwalla, C. H. Page, Effect of Low Grade Fuels, Combustible Wastes and Non–Traditional Raw Materials, 9th International Congress on the Chemistry of Cement, vol. 1, New Delhi, 1992, pp. 837–842.

P. Liebl, W. Gerger, "Benefits and Limitations When Using Secondary Materials," Process Technology of Cement Manufacturing, Kongress Verein Deutscher Zementwerke e.V., Dusseldorf, 1993.

M. E. Asim, "Blastfurnace Slag Processing to Blended Cements," *Zement–Kalk–Gips,* No. 12/1992, pp. E311–E317.

F. Puertas, M. T. Blanco–Varela, A. Palomo, T. Vázquez, "Reactivity and Burnability of Raw Mixes Made with Crystallized Blastfurnace Slags—Part I," *Zement–Kalk–Gips,* No. 8/1988, pp. 398–402.

F. Puertas, M. T. Blanco–Varela, A. Palomo, T. Vázquez, "Reactivity and Burnability of Raw Mixes Made with Crystallized Blastfurnace Slags—Part II," *Zement–Kalk–Gips,* No. 12/1988, pp. 628–631.

M. Schmidt, "Cement with Interground Additives," *Zement–Kalk–Gips,* Apr. 1992, vol. 45.

V. K. Gore, S. A. Khadikar, P. G. Lele, C. H. Page, A. K. Chatterjee, "Conservation of Raw Material Through Use of Industrial Wastes in Cement Manufacture," 9th International Congress on the Chemistry of Cement, vol. II, New Delhi, 1992.

A. Dasgupta, "On Making a Special Cement Clinker Using Indian Blast Furnace Slag as a Raw Material," *Technology,* vol. 12, No. 1, 1975.

R. S. Boyton, Chemistry and Technology of Lime and Limestone, 2nd Edition, 1980.

J. Grzymek, "The Combined Methods of Cement Production," The VI International Congress on the Chemistry of Cement, Moscow, Sep. 1974, pp. 3–67.

G. K. Moir, F. P. Glasser, "Mineralisers, Modifiers and Activators in the Clinkering Process," 9th International Congress on the Chemistry of Cement, vol. 1, New Delhi, 1992, pp. 125–143.

D. B. N. Rao, J. M. Brugan, "Activity and Utilization of Slag in OPC Influenced by Advanced Grinding," *World Cement,* vol. 20, No. 6, Jun. 1989, pp. 205–206.

R. F. Blanks, H. L. Kennedy, "The Manufacture of Portland Cement," *The Technology of Cement and Concrete,* vol. I, 1955, pp. 98–105.

R. Kondo, M. Dalmon, M. Asakawa, T. Ito, "Iron Cement Made From Blastfurnace and Converter Slags," Review of the Twenty–Eighth General Meeting—Technical Session, The Cement Association of Japan, 1974, pp. 66–68.

H. Okumura, "Recycling of Iron– and Steelmaking Slags in Japan," First International Conference on Processing Materials for Properties, pp. 803–806. No date available.

H. Miyairi, A. Suzuki, J. Haruna, "Ceramic Uses of Blast–Furnace Slag," *Nippon Steel Technical Report,* No. 17, Jun. 1981.

R. Kondo, M. Daimon, M. Asakawa, Fuel Economized Ferrite Cement Made From Blastfurnace and Converter Slags, Apr. 13–14, 1976.

F. P. Maroto, T. V. Moreno, "Use of Blast–Furnace Slag as Raw Mix in the Obtaining of Cement and the Modification of its Phases with Manganese Hydration Reactions," Informes de la Construccion vol. 39, Nov./Dec. 1987.

Li Changhua, "The Effect and Principle of Industrial Wastes Used in Wet Rotary Kiln," pp. 636–640. No date available.

C. C. Solomon, *Annual Report—Slag—Iron and Steel,* U. S. Department of the Interior, Bureau of Mines, 1993, pp. 1–15.

J. Beretka, B. de Vito, L. Santoro, N. Sherman, G. L. Valenti, "Hydraulic Behaviour of Calcium Sulfoaluminate–Based Cements Derived from Industrial Process Wastes," *Cement and Concrete Research,* An International Journal, vol. 23, No. 5, 1993.

Broyage, "High Efficiency Vertical Mills For Cement Clinker and Slag," *Ciment, Betons, Platres, Chaux,* No. 806, 1994.

N. Kogan, Dr. O. Mehedlov–Petrossyan, A. Zdorov, N. Drepin, "The Reduction of Specific Heat and Electrical Energy Consumption by the Use of Waste From Metallurgical Processes as Cement Raw Mixture Components," Proceedings of 7th International Congress on Construction Materials and Silicates, 1979.

Academician N. M. Zhavoronkov, A. S. Boldyrev, N. P. Kogan, S. D. Makashev, O. P. Mchedlov–Petrosyan, A. A. Pashchenko, S. A. Fataliev, T. Yu. Shchetkina, "Theoretical Substantiation of the Use of New Types of Raw Material in the Cement Industry," Doklady akademin nauk SSSR, vol. 245, No. 3, 1979, pp. 666–669.

V. D. Barbanyagre, V. M. Shamshurov, T. I. Timoshenko, "Characteristics of the Sintering Process of Cement Mixes," *Belgorod Technological Institute of Construction Materials,* Tsement, No. 2, 1993, pp. 21–24.

J. Geiseler, Utilization of Steel Works Slags, presented at the Ironworks Day on Nov. 15, 1990 in Dusseldorf, Stahl u. Eisen 111 (1991), No. 1, 133–138.

E. G. Drevitiskii, A. G. Dobrovol'skii, A. A. Korobok, excerpt from "Increasing Operating Efficiency of Rotary Kilns," Moscow, Stroizdat, 1990, pp. 98–101.

A. P. Vitushkin, V. N. Panyushkina, "Saving Fuel and Energy Resources in Cement Production," Report from an All–Union Seminar, Tsement, No. 2, 1998.

A. A. Pachchenko, E. A. Myasnikova, V. V. Takarchuk, "Clinker Formation in Unground Raw Material Mixes," Kiev Polytechnic Institute, Tsement, 4:20–21, 1987.

Recommendations on Development of New Processing Operations, Excerpt from *Cement Industry,* Review information No. 1, "Clinker formation in oxide–salt melts," Moscow, 1987, pp. 43–49, 58–60.

Yu, G. Ench, N. P. Kogan, O. P. Mchediov–Petrosyan, "Sulfate–Resistance Portland Cement Based on Ferruginous Waste Slags," Yuzhgipro Tsement, Source Not Available, No date, pp. 13–15. ( No date available).

Yu, G. Ench, N. P. Kogan, O. P. Mchedlov–Petroysan, "Physicochemical Processes Occurring During Firing of a Raw Material Charge with Addition of Slag," Yuzhgiprotsement, Tsement, No. 3, pp. 9–11, 1984.

N. P. Krogan, A. I. Piven, I. I. Timchenko, V. Ya. Ryazantsev, D. N. Verbitskii, O. N. Zhukova, "Effect of Self–Decomposing Waste Blast Furnace Slag on Firing of Cement Clinker, New Trends in Intensification and Investigation of Clinker Firing and Cement Setting Processes," Transactions of the State All–Union Scientific Research Institute of the Cement Industry, No. 76, Moscow, 1983, pp. 110–115.

R. M. Dzvonkovskii, A. P. Kholodnii, M. M. Korobov, A. P. Osokin, "New Energy–Saving Clinker Firing Process S–Firing)," "New Trends in Intensification and Investigation of Clinker Firing and Cement Setting Processes," Transactions of the State All–Union Scientific Research Institute of the Cement Industry, No. 76, Moscow, 1983, pp. 90–96.

M. V. Babich, V. L. Bernshtein, A. I. Zdorov, "Optimization of Composition of Raw Material Mixes for Firing of Clinkers in Kilns of the Dry Method of Production," "New Trends in Intensification and Investigation of Clinker Firing and Cement Setting Processes," Transactions of the State All–Union Scientific Research Institute of the Cement Industry, No. 76, Moscow, 1983, pp. 52–58.

A. I. Zdorov, Ya. Yu. Grodzinkskii, S. T. Lobkovskaya, "Use of Industrial Wastes in Cement Production," Yuzhgiprotsement, Tsement, 7:9–10, 1983.

V. L. Bernstein, M. V. Babich, "Use of Metallurgical Wastes in Cement Production," Yuzhgiprotsement, Use of Technogenic Materials in Cement Production, Transactions of the State All–Union Research Institute of the Cement Industry, Moscow, 1982, pp. 23–29.

Illegible authors & R. I. Timchenko, A. Yu. Turchik, "Intensification of Firing Processes by Using Components with Increased Chemical Energy in the Composition of a Raw Material Mix, New Trends in Intensification and Investigation of Clinker Firing and Cement Setting Processes," Transactions of the State All–Union Scientific Research Institute of the Cement Industry, No. 76, Moscow, 1983, pp. 40–51.

V. A. P'yachev, Effective Ferruginous Raw Material for Clinker Production, Tsement, 5, May, 1981.

V. A. P'yachev, V. N. Cherepanova, S. V. Saenko, "Use of Slags From Oxidized Nickel Ores in the Production of Clinker," Kompleksnoe Ispol'zovanie mineral'nogo syr'ya, 6:32–36, 1980.

S. A. Sad'kova, E. R. Priev, "Improvement of Properties of Loess Brick," Samarkand Architectural–Construction Institute, Stroit, Mater., 7:12, 1980.

R. Dogandzheiva, V. Vylkov, I. Vylkova, V. Vylkov, L. Gigova, "Use of Slags from the Kremikovets Integrated Iron and Steel Works in the Production of Portland Cement Clinker," Excerpts from Transactions of the 5th All–Union Scientific–Technical Conference on Chemistry and Technology of Cement, Moscow, 1980, pp. 160–163.

B. V. Volkonskii, L. Ya. Gol'dschtein, S. D. Makashev, "Problems of Use of Technogenic Byproducts and Industrial Wastes in Cement Production," Transactions of the 5th All–Union Scientific–Technical Conference on Chemistry and Technology of Cement. Moscow, 1980, pp. 142–144.

A. S. Saduakasov, D. N. Abishev, V. A. Ashirov, R. Zh. Dzhakupova, K. M. Satova, Zh. K. Abil'daev, "Electrothermophosphorus Slag—Raw Material for Production of Binders and Refractories," Kempleksnoe ispol'zovanie mineral'nogo syr'ya, 1:51–56. (No date available).

V. I. Zharko, "Effectiveness of Additional Supply of Blast Furnace Slag to the Kiln," Tsement, 11:8, 1978.

V. A. P'yachev, V. N. Cherepanova, Ya. Sh. Shkhol'nik, A. B. Zapol'skaya, "Highly Basic Blast Furnace Slag as a Raw Material Component in the Production of Cement Clinker," Slags of Furnace Metallurgy, Transactions of the Ural Scientific Research Institute of Iron and Steel, 25:99–106, 1976.

"Use of Copper–Smelting Slags in Cement Production," Cement Industry, Series 1 (Review Information), No. 1, Moscow, 1981, pp. 3–27.

M. Schmidt, Cement with interground additives—Capabilities and environmental relief, Part 1, Zement–Kalk–Gips, 1991, pp. 64–69.

M. E. Asim, "Blastfurnace Slag Processing to Blended Cements", Zement–Kalk–Gips, 1992, pp. 519–528.

J. Stark and A. Muller, International Development Trends in Low–energy Cements, Zement–Kalk–Gips, 1988, pp. 162–165.

S. Sprung, "Reducing Environmental Pollution by Using Secondary Raw Materials," Zement–Kalk–Gips, 1992, pp. 213–220.

G. Blunk and J. Geiseler, "The Use of Steelmaking Slags, Represented by Selected Examples," Stahl u. Eisen 100, No. 3, 1980, pp. 118–123.

This application is related to the subject matter of the following Civil Action which was mutually dismissed with prejudice prior to filing this application: United States District Court for the Northern District of Texas, Dallas Division, Texas Industries, Inc. v. Texas–Lehigh Cement Company, Civil Action No. 3–98CV1731G, 1998.

ACI Committee, "Ground Granulated Blast–Furnace Slag as a Cementitious Constituent in Concrete," pp. 226.1R–1–226. 1R–15, ACI 1987 (no month).

ASTM Committee, "Standard Specification for Ground Granulated Blast–Furnace Slag for use in Concrete and Mortars," pp. 495–499, ASTM Jun. 1989.

Maslehuddin, et al., "Corrosiion of Reinforcing Steel in Concrete Containing Slag or Pozzolans," pp. 24–31, ASTM 1990 (no month).

Douglas, et al., "Characterization of Ground Granulated Blast–Furnace Slags and Fly Ashes and Their Hydration in Portland Cement Blends," pp. 38–46, ASTM 1990 (no month).

Sarkar, et al. "Synergistic Roles of Slag and Silica Fume in Very High–Strength Concrete," pp. 32–37, ASTM 1990 (no month).

Cowan et al., "Conversion of Drilling Fluids to Cements with Blast Furnace Slag: Performance Properties and Applications for Well Cementing," pp. 277–288, Society of Petroleum Engineers (date unknown).

"Engineering and Design Standard Practice for Concrete," 2–2 thru 2–5 and 2–10, Department of the Army, Corps of Engineers, Sep. 5, 1985.

Chaterjee, "Cement Raw Materials and Raw Mixes," Part I, PIT & Quarry/Sep. 1979.

Chaterjee, "Cement Raw Materials and Raw Mixes," Part II, PIT & Quarry/Nov. 1979.

Gouda, "The Effect of Fluxes on Energy Conservation," pp. 46–51, ICS Proceedings 1980.

Maula, et al., "Effect of Oxidic Composition on Portland Cement Raw Material Burnability," World Cement Technology, Sep. 1980.

Gouda, "Raw Mix: The Key for a Successful and Profitable Cement Plant Operation."

Chatterjee, "Phase Composition, Microstructure, Quality and Burning of Portland Cement Klinkers—A Review of Phenomenological Interrelations" Part I—World Cement Technology, May 1979.

Chatterjee, "Phase Composition, Microstructure, Quality and Burning of Portland Cement Klinkers—A Review of Phenomenological Interrelations" Part II—World Cement Technology, Jun. 1979.

* cited by examiner

METHOD FOR MANUFACTURING CEMENT USING A RAW MATERIAL MIX INCLUDING FINELY GROUND STEEL SLAG

RELATED APPLICATION

This application claims the benefit of provisional patent application serial No. 60/100,815 filed on Sep. 18, 1998 with the same title.

TECHNICAL FIELD OF THE INVENTION

The present invention relates generally to a method for manufacturing cement using a mixture of finely ground raw materials including steel slag.

BACKGROUND OF THE INVENTION

In the engineering and construction industry, the terms "cement" and "Portland cement" are generally used to describe hydraulic cement produced by burning a mixture of finely ground calcareous and argillaceous materials to form cement clinker. The burning process produces calcium silicates and calcium aluminates which chemically react with water to form a hard, stone-like mass. Clinker generally includes coarse granules and irregularly shaped nuggets often varying in size from two to three inches in diameter or greater. The resulting clinker is typically ground in a finishing mill to form fine dry cement powder. A small amount of gypsum is normally added during the clinker grinding process to retard setting of the resulting cement. The finely ground cement powder may be mixed with sand, coarse aggregate and water to produce mortars and concrete. Hydraulic cement or Portland cement generally includes tricalcium silicate, dicalcium silicate, tricalcium aluminate and tetracalcium aluminoferrite.

A wide variety of hydraulic cements are presently used in modern engineering and construction projects. Portland cements are normally made in five types. The characteristics and properties of these five types have been standardized on the basis of ASTM Standard Specification for Portland Cement© 150). The differences between Types I, II, III, IV and V are based on both chemical and physical requirements. Typically the chemical and physical composition of raw materials added to a kiln are adjusted to produce cement clinker have the appropriate chemical composition for the desired type of hydraulic cement.

U.S. Pat. No. 5,393,342 entitled Cement Composition and Method for the Preparation Thereof discloses a cement composition consisting of ground cement clinker, ground blast furnace slag and comminuted steel slags. The invention described in the '342 Patent includes mixing ground steel slags at normal or elevated temperatures and pressures with ground cement clinker and ground, granulated blast furnace slags. The resulting mixture may be cooled if desired and comminuted to obtain a hydraulically hardenable cement composition. Example 2 of the '342 Patent states:

"The steel slag powder was mixed with the raw materials customary for Portland cement clinker, the amount of steel slags added being about 25% of the total amount of blast furnace slags present in blast furnace slag cement, and treated at a temperature of about 1400° C. in a cement furnace. After cooling, the steel-slag cement thus obtained was finely ground and mixed with ground, granulated blast furnace slags in order to obtain a cement composition."

U.S. Pat. No. 5,494,515 entitled Method and Apparatus for Using Blast-Furnace Slag in Cement Clinker Production and U.S. Pat. No. 5,421,880 entitled Method and Apparatus for Using Steel Slag in Cement Clinker Production disclose apparatus and procedures for using slag in the manufacture of cement.

Ferrolime, sometimes referred to as "lime slag", a byproduct from manufacturing steel, has previously been used in the manufacture of cement clinker with equipment such as shown and described in this patent application.

SUMMARY OF THE INVENTION

In accordance with teachings of the present invention, disadvantages and problems associated with previous methods for using steel slag to manufacture cement have been substantially reduced or eliminated. The present invention provides a method for manufacturing cement from a mixture of finely ground raw materials which includes steel slag.

Technical benefits of the present invention include allowing existing equipment associated with storing, mixing, grinding and processing raw materials used to manufacture cement to also incorporate finely ground steel slag as an integral part of the raw materials supplied to the feed end of a kiln. Mixing steel slag with other raw materials prior to placing the steel slag in a raw mill may minimize any tendency of the steel slag to cause excessive wear or damage to the raw mill. Additional equipment is not required to add steel slag to the kiln separate from other raw materials supplied to the feed end of the kiln. Adding steel slag to a kiln in accordance with teachings of the present invention eliminates the need to provide additional equipment such as a steel slag conveyor belt extending to the feed end of the kiln, a weigh feeder and perhaps a rotary feeder or an airlock. Depending upon the existing raw material storage system, addition of a steel slag storage bin may not be required. Processing steel slag in accordance with teachings of the present invention removes substantial amounts of any moisture present in the steel slag prior to adding the steel slag to the kiln. By removing moisture from finely ground steel slag prior to entering the kiln, heat losses are minimized and the production of non-combustible gases such as steam are reduced.

One aspect of the present invention includes mixing discrete quantities of steel slag with discrete quantities of other raw materials used to manufacture cement and comminuting the resulting raw material mixture in a raw mill. Exhaust gas from a kiln or waste heat from other processes associated with manufacturing cement is preferably supplied to the raw mill to remove any moisture contained in the steel slag and other raw materials. As a result of incorporating teachings of the present invention a dry powder including finely ground steel slag is produced by the raw mill. The finely ground steel slag will then react much more readily with other elements and chemical compounds contained in the raw material mixture when the dry powder is added to the feed end of a kiln. For example, steel slag often contains magnesium oxide (MgO) which melts at a relatively low temperature. Adding finely ground steel slag as an integral part of the raw material mixture supplied to the feed end of the kiln allows any magnesium oxide contained within the steel slag to more quickly melt and become liquid and assist with combining silica, aluminum and calcium to form chemical compounds associated with cement. Adding finely ground steel slag to the feed end of the kiln allows iron compounds, magnesium compounds and other compounds contained in the steel slag to start the liquification process earlier in the kiln which generally reduces overall energy consumption.

Further technical advantages of the present invention include the ability to adjust the quantity of steel slag and other raw materials supplied to the raw mill based on chemical composition of the steel slag and other raw material components and desired chemical characteristics of the resulting cement clinker. Prior to comminuting in the raw mill, steel slag generally has a substantially lower ratio of surface area to volume as compared to finely ground steel slag. Since thermal reactivity is a function of particle size, finely ground steel slag will generally be more thermally reactive when added to a kiln as compared to adding steel slag as received from a steel slag supplier to the same kiln.

The steel slag preferably includes a low concentration of iron which often reduces the need to add additional silica sand to the raw material mixture. For some applications, reducing the amount of silica sand required to produce the same amount of clinker, particularly silica sand containing quartzite, may reduce wear in the raw mill.

Mixing steel slag with other raw materials and placing the raw material mixture in a raw mill allows precise control of the ratio and proportions of the various raw material components. The type and characteristics of cement clinker which will be produced can be predetermined and adjustments made to the raw material mixture prior to supplying to a kiln. Accuracy of raw material calculations may be verified by analyzing the resulting clinker. The present invention avoids having to react to analytical variations in the clinker after it has been produced.

BRIEF DESCRIPTION OF THE DRAWINGS

For a more complete understanding of the present invention, and the advantages thereof, reference is now made to the following brief description taken in conjunction with the accompanying drawings and detailed description, in which.

DETAILED DESCRIPTION OF THE INVENTION

Figure 1:
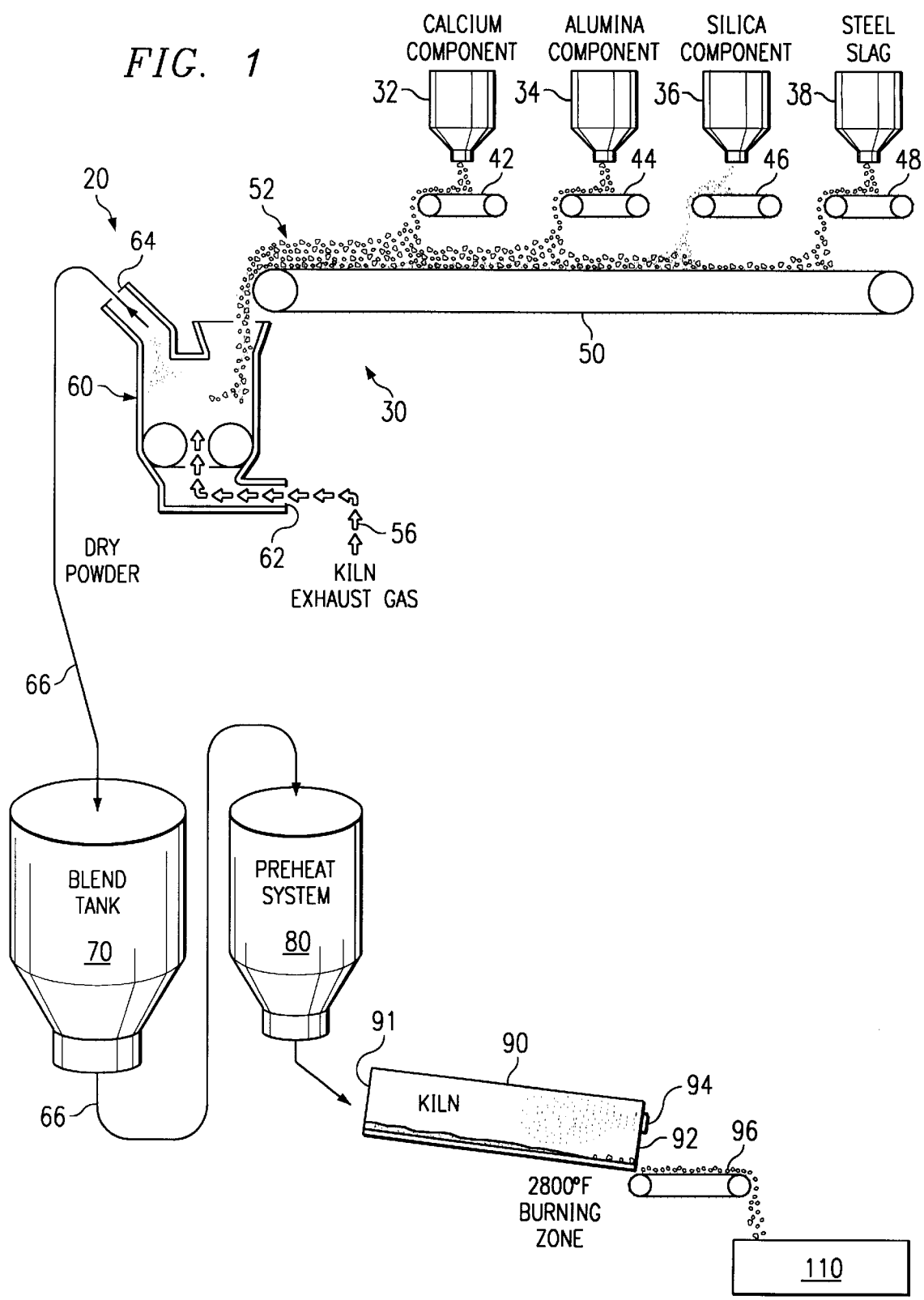
FIG. 1 is a schematic drawing of a rotary cement kiln and other conventional Portland cement manufacturing equipment which may be satisfactorily used to manufacture cement from a mixture of finely ground raw materials including steel slag in accordance with teachings of the present invention.
Figure 2:
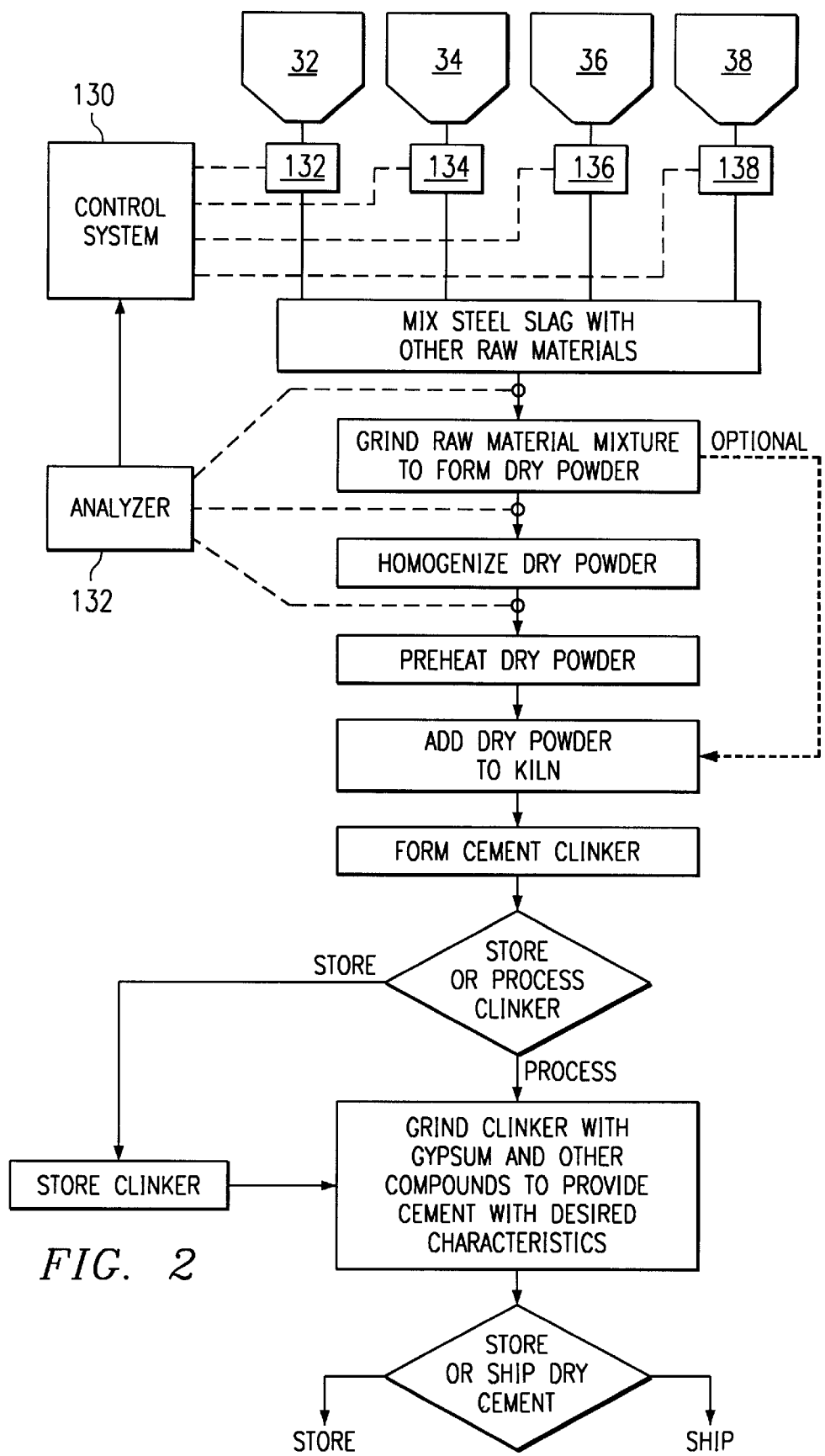
FIG. 2 is a block diagram showing a process for manufacturing cement using finely ground steel slag in accordance with teachings of the present invention.

Preferred embodiments of the present invention and its advantages are best understood by referring to FIGS. 1 and 2 of the drawings, in which like numerals refer to like parts.

FIG. 1 is a schematic drawing showing cement manufacturing facility 20 having conventional equipment typically associated with a rotary cement kiln using a dry cement manufacturing process to produce cement clinker. For many applications, cement may be manufactured from finely ground steel slag in accordance with teaching of the present invention without requiring the addition of new equipment or any significant modification of existing equipment.

For purposes of this patent application, the term "cement" is used to refer to hydraulic cement or Portland cement. The term "control system" is used to refer to any type of control system satisfactory for use in manufacturing cement. Examples of such control systems include computer control systems, manual control systems, and combined computer and manual control systems.

The term "kiln" is used to refer to any type of rotary kiln, rotary cement kiln, or any other furnace satisfactory for manufacturing cement clinker from limestone, clay and other raw materials normally associated with cement manufacturing. The term "clinker" is used to refer to cement clinker produced by a kiln. The term "raw mill" is used to refer to any type of grinding mill, ball mill, roller mill, or any other comminuting device satisfactory for comminuting or reducing raw materials including steel slag to a dry powder in accordance with teachings of the present invention.

The term "steel slag" is used to refer to any type of slag produced during the manufacture of iron based alloys in an iron converter, an open hearth furnace or an electric arc furnace. Examples of steel slag include air cooled steel slag, foamed steel slag, and granulated steel slag. Steel slag is often produced at a steel mill in large, irregularly shaped chunks or pieces. Such steel slag is preferably sized to accommodate design specifications of the associated raw mill prior to mixing with other raw materials in accordance with teachings of the present invention. Sizing of steel slag may be performed at the associated steel mill, at a cement manufacturing facility or at a steel slag supplier.

For the embodiment of the present invention as shown in FIG. 1, cement manufacturing facility 20 includes raw material storage and handling system 30, raw mill 60, blend tank 70, preheat system 80, kiln 90, and clinker storage facility 110. Kiln 90, as shown in FIG. 1, includes feed end or first end 91 and discharged end or second end 92. Feed end 91 is preferably elevated relative to discharge end 92. For the embodiment of the invention as shown in FIG. 1, kiln 90 may be described as a "rotary kiln." However, teachings of the present invention may be satisfactorily used to manufacture cement in any type of kiln.

Various types of raw materials including steel slag may be mixed with each other to produce a generally homogeneous, dry, fine powder which is added to the feed end of a kiln to produce cement clinker in accordance with teachings of the present invention. For the embodiment shown in FIG. 1, the raw materials preferably include a calcium component such as limestone or chalk, an alumina component such as yellow limestone, marl, clay or kaolin, and a silica component such as silica sand, sandstone, shale or clay steel slag component. The present invention is not limited to use with only these raw material components. A wide variety of other raw material components may be satisfactorily combined with steel slag to manufacture cement clinker in accordance with teachings of the present invention.

Raw material storage and handling system 30 as shown in FIG. 1 includes four storage containers or bins 32, 34, 36 and 38. Storage bin 32 may contain a calcium component such as limestone. Storage bin 34 may contain an alumina component such as yellow limestone. Storage bin 36 may contain a silica component such as sand. Storage container 38 preferably contains appropriately sized steel slag. For one application, the steel slag has a nominal diameter of approximately three fourths of an inch or less ($\leq 3/4"$).

Various types of raw material containers and/or storage bins may be satisfactorily used with the present invention. The number of storage containers and the type of storage containers may be modified depending upon the raw material components selected for manufacturing clinker 96 in kiln 90.

The output from each storage bin 32, 34, 36 and 38 is directed to respective conveyor belts 42, 44, 46 and 48. Various types of handling equipment and control systems may be satisfactorily used to supply the required amount of each raw material component from its respective storage bin 32, 34, 36 and 38 to raw material mixture 52 on conveyor belt 50. The present invention is not limited to use with storage bins 32, 34, 36 and 38 or conveyor belts 42, 44, 46 and 48.

Conveyor belts 42, 44, 46 and 48 deposit their respective raw material components onto larger conveyor belt 50 which supplies the resulting raw material mixture 52 to raw mill 60. Control system 130 and respective raw material component control systems 132, 134, 136 and 138 as shown in FIG. 2 may be satisfactorily used to ensure that the desired quantity of raw material mixture 52 with desired chemical characteristics is supplied to raw mill 60. By monitoring chemical and physical characteristics of each raw material component contained in storage bin 32, 34, 36 and 38 and adjusting the output from each storage bin 32, 34, 36 and 38, the desired quantity and ratio of raw material components used to form raw material mixture 52 may be carefully controlled. One of the technical benefits of the present invention includes supplying chemically optimized raw material mixture 52 to raw mill 60.

Raw material mixture 52 is ground, pulverized, comminuted and commingled within raw mill 60 to form finely ground particulate matter. For some applications, a portion of the exhaust gas 56 exiting from kiln 90 may be supplied to hot gas inlet 62 which can be at the bottom of raw mill 60. Exhaust gas 56 will heat the finely ground particulate matter to drive off any moisture contained in raw material mixture 52. For other applications, heated air or waste heat from other sources within cement manufacturing facility 20 may be supplied to raw mill 60. The resulting dry powder 66 will exit raw mill 60 through exhaust opening or exhaust duct 64.

Raw material mixture 52 may contain varying amounts of moisture. For example, steel slag from storage bin 38 may contain between two percent (2%) and seven percent (7%) moisture by weight depending upon the type of steel slag, associated environmental factors and meteorological conditions. One of the technical benefits of including steel slag in raw material mixture 52 is removal of any moisture contained within the steel slag by exhaust gas 56. If steel slag is added directly to feed end 91 of kiln 90, valuable process energy from heat source 94 will be required to remove this moisture. Therefore, removing moisture from finely ground steel slag within raw mill 60 using exhaust heat 56 or waste heat from another source will assist in reducing the total amount of energy required to produce clinker 96 and improve the overall efficiency of cement manufacturing system 20. Using exhaust gas 56 to remove moisture from finely ground steel slag and other raw materials contained within raw mill 60 will also generally reduce the volume of exhaust gas exiting from kiln 90 as compared to adding steel slag directly to feed end 91 of kiln 90 and removing any moisture in the steel slag within kiln 90.

Steel slag may often contain calcium and silica in the form of dicalcium silicate ($C_2S$). As a result of using steel slag, less energy is often required to produce the same volume of dicalcium silicate as compared to a cement manufacturing process which does not use steel slag. Also, the formation of tricalcium silicate ($C_3S$) from dicalcium silicate in the presence of free lime is generally an exothermic reaction which further reduces the total amount of energy required to produce clinker 96 from kiln 90. Therefore, except for any moisture contained therein, adding steel slag to raw material mixture 52 would be generally considered equivalent to adding a loss free and energy conserving material. Removing moisture from the steel slag within raw mill 60, results in the steel slag providing highly desired loss free and energy conserving material to form clinker 96.

Mixing steel slag with other raw materials to form raw mixture 52 may tend to minimize any potential for excessive wear or damage to raw mill 60 which may occur if only steel slag is finely ground in a raw mill separate from such raw materials. Although grinding steel slag in raw mill 60 may require some additional energy as compared to grinding only a raw material mixture having a calcium component, an alumina component and a silica component, using steel slag to manufacture clinker 96 in accordance with teachings of the present invention may result in overall energy savings as compared to other procedures and techniques for manufacturing cement clinker.

In some cement manufacturing processes, raw materials such as steel slag may be added directly to feed end 91 of kiln 90 without grinding or pulverizing. Dry powder 66 which includes finely ground steel slag is generally more thermally reactive within kiln 90 as compared to the same raw materials in larger particulate or nugget form. Large particles and nuggets generally have low heat transfer rates. Comminuting raw material mixture 52 within raw mill 60 results in more efficient heat transfer within an associated pyrosystem. A pyrosystem satisfactory for use with the present situation may include, but is not limited to, preheat system 80 and kiln 90.

The ratio of surface area to volume for the resulting dry powder 66 as compared to the ratio of surface area to volume of raw material mixture 52 entering raw mill 60 is substantially increased. Comminuting raw material mixture 52 including steel slag improves the heat transfer rate of the associated pyrosystem particularly within an air suspension type preheater such as preheat system 80 which may further decrease total energy required to produce clinker using steel slag.

Appropriately sized conduits (not expressly shown) are preferably provided to direct dry powder 66 from exhaust duct 64 to one or more blend tanks 70. Blend tank 70 may be described as a large storage tank in which dry powder 66 enters from the top and air enters from the bottom. The air flow mixes with and turns dry powder 66 over within blend tank 70 to substantially reduce any variation in the chemical composition of dry powder 66. For some applications, blend tank 70 may have a turndown ratio of ten to one on selected control parameters such as tricalcium silicate ($C_3S$) or lime saturation factor. As a result of including finely ground steel slag within dry powder 66, blend tank 70 helps to insure that a more homogeneous raw material mixture with the desired chemical composition and ratios is supplied to feed end 91 of kiln 90.

Dry powder 66 exiting blend tank 70 may have a temperature approximately equal to the temperature of the air used to turn dry powder 66. For some applications, this temperature may be approximately one hundred sixty degrees Fahrenheit to one hundred eighty degrees Fahrenheit (160° F. to 180° F.). However, a wide variety of blend systems may be satisfactorily used with the present invention. The temperature of dry powder exiting from such blend systems may vary substantially. Dry powder 66 exiting from blend tank 20 will normally have a temperature greater than ambient due to heating and drying within raw mill 60. The temperature of dry powder 66 exiting from blend tank 70 will depend upon many factors such as specific blending methods and type of blender, residence type of dry powder within the associated blender, characteristics of material transport system between raw mill 60 and blend tank 70 and return of kiln dust (if any) to blend tank or tanks 70.

Dry powder 66 is preferably directed from blend tank 70 to preheat system 80. Alternatively, dry powder 66 may be supplied directly to kiln 90. See FIG. 2.

For some applications, preheat system 80 may include a preheat tower or a preheat tower in combination with a precalciner (not expressly shown). Calcining is the process of heating raw materials to a high temperature without fusing the raw materials so that hydrates, carbonates and other volatile compounds are decomposed and expelled from the raw materials. Calcined limestone refers to limestone which has been heated in a calciner or calcining furnace to drive off carbon dioxide.

Rotary cement kiln 90 is one example of a calcining furnace. If dry powder 66 is applied directly to kiln 90, all of the calcining required to form clinker 96 from dry powder 66 must occur within kiln 90.

A typical preheat tower used in pyroprocessing systems associated with manufacturing cement may calcine approximately thirty to forty percent (30%–40%) of a raw material mixture. Combining a precalciner with a preheat tower in a pyroprocessing system may result in calcining approximately ninety to ninety-five percent (90%–95%) of a raw material mixture.

Preheat system 80 with a precalciner forming a portion thereof may increase the temperature of dry powder 66 to approximately sixteen hundred degrees Fahrenheit (1600° F.). Without a precalciner, preheat system 80 may increase the temperature of dry powder 66 to approximately fourteen hundred and fifty degrees Fahrenheit (1450° F.). Preheat system 80 is preferably designed to accomplish the desired heat transfer and calcining in a relatively short time period such as thirty seconds to approximately one minute. Adding steel slag to raw material mixture 52 allows the resulting finely ground steel slag to be rapidly and efficiently heated in preheat system 80 and thus reduces total energy requirements as compared to directly adding steel slag to feed end 91 of kiln 90.

If exhaust gas or waste heat from another source within cement manufacturing facility 20 is not used within raw mill 60 and preheat system 80, the volume of natural gas or other combustible material supplied to kiln 90 from heat source 94 will generally need to be increased which will result in an increased volume of exhaust gas exiting from kiln 90. Therefore, another technical benefit of the present invention includes removing moisture from finely ground steel slag within raw mill 60 and preheating the finely ground steel slag along with other finely ground raw material components within preheat system 80 to reduce the overall volume of exhaust gas produced by kiln 90.

Raw material mixture 52 and/or dry powder 66 may be systematically sampled and analyzed as shown in FIG. 2 to determine if any changes are required to the amount of steel slag or other raw material components being added to raw material mixture 52. This sampling and any desired changes can be made without waiting for analysis of clinker 96 exiting from discharge end 92 of kiln 90. If a problem should occur in supplying one or more raw material components to raw material mixture 52, corrective action may be promptly taken to minimize any delay in correcting the chemical composition and chemical ratios of raw material mixture 52 supplied to raw mill 60. If one or more raw material components are lost, or if a change in chemical composition of one or more raw material components occurs, cement manufacturing facility 20 may continue to produce clinker 96 from the raw material mixture present in blend tank or tanks 70 and preheat system 80. By including steel slag within raw material mixture 52, sufficient time is available to take appropriate corrective action without harming the operation of kiln 90.

One of the technical benefits of the present invention includes the ability to use control system 130 and raw material component control systems 132, 134, 136 and 138 to quickly and accurately adjust the quantity and chemical composition of raw material mixture 52 supplied to raw mill 60. Control system 130 and raw material component control systems 132, 134, 136 and 138 may be presently available or future control systems satisfactory for use in manufacturing cement. For some applications, control system 130 and/or raw material component control systems 132, 134, 136 and 138 will preferably include one or more computers and microprocessors.

For some applications, at least one analyzer 132, such as a simultaneous X-ray spectrometer, may be provided to monitor chemical characteristics and ratios associated with raw material mixture 52 entering raw mill 60 and/or dry powder 66 exiting from raw mill 60. See FIG. 2. For other applications, analyzer 132 may monitor the chemical characteristics of raw material components contained in storage bins 32, 34, 36 and 38 (not expressly shown). The output from analyzer 132 is preferably provided to control system 130 to adjust the output from storage bins 32, 34, 36 and 38.

For some applications, dry powder 66 supplied to feed end 91 of kiln 90 is preferably monitored and controlled to provide "target" chemical compositions in the resulting clinker 96. The chemical composition of dry powder 66 may be selected to provide the desired concentration of tricalcium silicate and tricalcium aluminate and silica ratio in the resulting clinker 96. For other applications, lime saturation factor, silica ratio and alumina ratio may be used as targets to control the resulting clinker 96. By including steel slag within raw material mixture 52, the chemical concentration of dry powder 66 supplied to feed end 91 may be more precisely adjusted and the chemical change at inlet 91 of kiln 90 controlled as the desired raw material target for clinker 96 is changed.

The chemical and physical characteristics of steel slag added to raw material mixture 52 may be closely monitored and controlled to insure that clinker 96 produced by kiln 90 will have the desired amount of iron concentration. For some applications, the steel slag will preferably have less than twenty to twenty five percent (20% to 25%) by weight of iron. Steel slag with approximately fifteen percent to twenty percent (15% to 20%) by weight of iron may be particularly beneficial for reducing sand requirements. Low iron concentration in the steel slag often allows for substitution by other energy conserving, loss free minerals, which often allow for added clinker production. Steel slag with low concentrations of iron may be particularly beneficial for manufacturing Type I cement and Type II cement.

The iron content of the steel slag may affect the type of cement clinker produced by kiln 90. For example, one of the principal differences between Type I cement and Type II cement is the concentration of tricalcium aluminate ($C_3A$). One of the ways to lower the concentration of tricalcium aluminate in cement clinker 96 is to increase the amount of iron added to feed end 91 of kiln 90. Therefore, if the steel slag supplied to kiln 90 has an iron content of approximately twenty percent (20%) by weight, a greater quantity of the steel slag may be added to kiln 90 without changing the type of cement clinker 96 produced therefrom as compared to adding steel slag having forty percent (40%) by weight iron.

If the iron concentration of the steel slag contained within raw material mixture 52 is approximately forty percent (40%), the quantity of steel slag added to kiln 90 must be substantially reduced to prevent the higher iron concentration from affecting the type of cement clinker produced therefrom. Therefore, steel slag having an iron concentration of fifteen to twenty percent (15% to 20%) by weight allows adding a substantially greater quantity of energy loss free material to kiln 90 as compared to steel slag having an iron concentration of thirty to forty percent (30% to 40%) by weight.

For some applications, such as manufacturing very low $C_3A$ cement, it is often preferable to include a relatively high concentration of iron in raw material mixture 52. One of the benefits of the present invention is that various types and quantities of raw material components may be easily added to raw material mixture 52. Thus, for those applications in which a high iron concentration is desired in raw material mixture 52, the flow of steel slag from storage container 38 may be reduced or stopped. A highly concentrated source of iron such as mill scale may be added to augment steel slag's relative deficiency in iron, or mill scale may entirely replace steel slag. The highly concentrated source of iron may be added to raw material mixture 52 from another storage bin (not expressly shown) to provide the desired iron concentration in raw material mixture 52 and resulting dry powder 66. Some types of mill scale may have an iron content of approximately ninety-five percent (95%) by weight.

Magnesium oxide (MgO) and other oxides are often present in one or more raw material components associated with manufacturing cement. Magnesium oxide functions as a fluxing agent. Since magnesium oxide typically melts at a relatively low temperature as compared to other components in raw material mixture 52, magnesium oxide will form liquid metal proximate to feed end 91 of kiln 90. As a result, silica, aluminum and calcium contained in dry powder 66 will tend to combine and form a liquid closer to feed end 91. An early start in liquification of dry powder 66 proximate feed end 91 helps reduce total energy consumption associated with manufacturing clinker 96 in kiln 90.

For those applications in which the available calcium component, alumina component, and/or silica component have relatively low magnesium oxide concentrations, adding steel slag to raw material mixture 52 may augment the amount of magnesium oxide present in dry powder 66 to optimize liquification within kiln 90. For some applications, steel slag added to raw material mixture 52 will preferably have a concentration of at least five percent (5%) by weight of magnesium oxide.

Comminuting steel slag in raw mill 60 allows magnesium oxide along with other components contained in the steel slag to more quickly react within kiln 90. The magnesium oxide present in the steel slag is heated in preheat system 80. Comminuting the steel slag in accordance with teachings of the present invention allows quicker, more effective heat transfer to the magnesium oxide contained within the steel slag as it enters feed end 91 of kiln 90. Adding finely ground steel slag with a relatively high magnesium oxide concentration to feed end 91 of kiln 90 further reduces the overall energy requirements to produce cement clinker 96.

Although the present invention has been described by several embodiments, various changes and modifications may be suggested to one skilled in the art. It is intended that the present invention encompasses such changes and modifications as fall within the scope of the present appended claims.

APPENDIX

Chemical Elements Associated with Hydraulic Cement

| NAME | SYMBOL | NAME | SYMBOL |
| --- | --- | --- | --- |
| aluminum | Al | oxygen | $O_2$ |
| calcium | Ca | potassium | K |
| carbon | C | silicon | Si |
| iron | Fe | sulfur | S |
| magnesium | Mg | sodium | Na |

Raw Materials and Chemical Compounds Associated with Manufacturing Cement

| Name | Chemical Formula |
| --- | --- |
| alumina | $Al_2O_3$ |
| calcium carbonate | $CaCO_3$ |
| clays (kaolin & montmorllionite) | $Al_2O_3.XSiO_2.nH_2O$ |
| ferric oxide | $Fe_2O_3$ |
| limestone | a source of $CaCO_3$ |
| magnesium oxide | MgO |
| mill scale | — |
| potassium oxide | $K_2O$ |
| silica | $SiO_2$ |
| sodium oxide | $Na_2O$ |
| steel slag | — |
| sulfate | $SO_3$ |

Chemical Compounds Frequently Present in Cement

| Name | Chemical Formula | Abbreviation |
| --- | --- | --- |
| alkali containing aluminate | $(K, Na)_2O.8CaO.3Al_2O_3$ | $(K_1N)C_8A_3$ |
| alkali sulfate | $(K, Na)_2SO_4$ | |
| calcium aluminoferrite | $2CaO.(Al_2O_{31}Fe_2O_3)$ | $C_2(A_1F)$ |
| calcium sulfate | $CaSO_4$ | |
| dicalcium silicate | $2CaO.SiO_2$ | $C_2S$ |
| free lime | CaO | |
| free magnesium oxide (periclase) | MgO | |
| tetracalcium aluminoferrite | $4CaO.Al_2O_3.Fe_2O_3$ | $C_4AF$ |
| tricalcium silicate | $3CaO.SiO_2$ | $C_3S$ |
| tricalcium aluminate | $3CaO.Al_2O_3$ | $C_3A$ |

What is claimed is:

1. A method of manufacturing cement clinker using a kiln having a feed end and a discharge end with the feed end elevated relative to the discharge end comprising:

preparing a mixture of raw materials including steel slag;

supplying the mixture of raw materials to a raw mill;

comminuting the mixture of raw materials including the steel slag within the raw mill to finely ground particulate matter and thereby forming a more homogeneous mixture of the raw materials including the steel slag;

supplying the finely ground particulate matter to the feed end of the kiln; and supplying heat energy to the kiln such that, as the finely ground particulate matter moves from the feed end toward the discharge end, chemical reactions occur within the finely ground particulate matter to form cement clinker.

2. A method of manufacturing cement clinker using a kiln having a feed end and a discharge end with the feed end elevated relative to the discharge end comprising:

preparing a mixture of raw materials including steel slag;

supplying the mixture of raw materials to a raw mill;

comminuting the mixture of raw materials including the steel slag within the raw mill to finely ground particulate matter and thereby forming a more homogeneous mixture of the raw materials;

supplying the finely ground particulate matter including the now finely ground steel slag to the feed end of the kiln;

supplying heat energy to the kiln such that, as the finely ground particulate matter moves from the feed end toward the discharge end, chemical reactions occur within the finely ground particulate matter to form cement clinker; and the steel slag comprises less than five percent by weight of the mixture of raw materials supplied to the raw mill to minimize wear and damage to the raw mill caused by the steel slag.

3. The method of claim 1 wherein the raw materials further comprise a calcium component, an alumina component and a silica component.

4. The method of claim 1 wherein the kiln uses a dry process.

5. The method of claim 1 wherein the steel slag comprises less than approximately twenty five percent by weight of iron.

6. The method of claim 1 wherein the steel slag comprises less than approximately twenty percent by weight of iron.

7. The method of claim 1 wherein the steel slag comprises less than approximately fifteen percent by weight of iron.

8. A method of manufacturing cement clinker using a kiln having a feed end and a discharge end with the feed end elevated relative to the discharge end comprising:

preparing a mixture of raw materials including steel slag;

supplying the mixture of raw materials to a raw mill;

comminuting the mixture of raw materials including the steel slag within the raw mill to finely ground particulate matter and thereby forming a more homogeneous mixture of the raw materials;

supplying the finely ground particulate matter to the feed end of the kiln;

supplying heat energy to the kiln such that, as the finely ground particulate matter moves from the feed end toward the discharge end, chemical reactions occur within the finely ground particulate matter to form cement clinker; and adding steel slag having an iron concentration of less than approximately twenty five percent by weight to the mixture of raw materials prior to comminuting to allow a greater quantity of the steel slag to be included in the raw material mixture while maintaining substantially the same chemical composition of cement clinker produced by the kiln.

9. The method of claim 1 wherein the steel slag comprises more than approximately five percent by weight of magnesium oxide.

10. The method of claim 1 wherein the steel slag comprises more than approximately five percent by weight of magnesium oxide and less than approximately twenty five percent by weight of iron.

11. A method of manufacturing cement clinker using a kiln having a feed end and a discharge end with the feed end elevated relative to the discharge end comprising:

preparing a mixture of raw materials including steel slag and raw material selected from the group consisting of a calcium component, an alumina component, and a silica component;

supplying the mixture of raw materials including the steel slag to a raw mill;

reducing the mixture of raw materials within the raw mill to finely ground particulate matter and thereby commingling the raw materials including the steel slag with respect to each other;

supplying gas at an elevated temperature to the raw mill to remove moisture from the raw material mixture and resulting finely ground particulate matter to produce a dry powder;

supplying the dry powder to a blend tank to further commingle the finely ground steel slag with the other finely ground raw materials;

supplying the dry powder including the finely ground steel slag to a preheat system to improve the overall thermal efficiency of the method of manufacturing cement clinker;

supplying the dry powder from the preheat system to the feed end of the kiln; and supplying heat energy to the kiln such that as the dry powder moves from the feed end toward the discharge end chemical reactions occur within the dry powder to form cement clinker.

12. The method of claim 11 wherein the dry powder exits the blend tank and enters the preheat system at a temperature generally in the range of greater than ambient temperature and less than approximately one hundred eighty degrees Fahrenheit and the dry powder exits the preheat system and enters the feed end of the kiln at a temperature greater than approximately fourteen hundred degrees Fahrenheit.

13. The method of claim 11 wherein the dry powder exits the blend tank and enters the preheat system at a temperature greater than approximately one hundred and fifty degrees Fahrenheit.

14. The method of claim 11 wherein the dry powder exits the preheat system and enters the feed end of the kiln at a temperature greater than approximately fourteen hundred degrees Fahrenheit.

15. The method of claim 11 wherein the dry powder exits the preheat system and enters the feed end of the kiln at a temperature greater than approximately sixteen hundred degrees Fahrenheit.

16. A method of manufacturing cement clinker using a kiln having a feed end and a discharge end with the feed end elevated relative to the discharge end comprising:

preparing a mixture of raw materials used to produce clinker including steel slag;

supplying the mixture of raw materials including the steel slag to a raw mill;

reducing the mixture of raw materials within the raw mill to finely ground particulate matter and thereby commingling the raw materials including the steel slag with respect to each other;

supplying gas at an elevated temperature to the raw mill to remove moisture from the raw material mixture and resulting finely ground particulate matter to produce a dry powder;

supplying the dry powder to a blend tank to further commingle the finely ground steel slag with the other finely ground raw materials;

supplying the dry powder including the finely ground steel slag to a preheat system to improve the overall thermal efficiency of the method of manufacturing cement clinker;

supplying the dry powder from the preheat system to the feed end of the kiln;

supplying heat energy to the kiln such that as the dry powder moves from the feed end toward the discharge end chemical reactions occur within the dry powder to form cement clinker; and monitoring and controlling chemical and physical characteristics of the steel slag included in the mixture of raw materials to produce clinker with a concentration of iron.

* * * * *

UNITED STATES PATENT AND TRADEMARK OFFICE
CERTIFICATE OF CORRECTION

PATENT NO. : 6,491,751 B1
DATED : December 12, 2002
INVENTOR(S) : Robert C. Watson It is certified that error appears in the above-identified patent and that said Letters Patent is hereby corrected as shown below:

Column 4,
Line 54, replace the equation with ($\leq\tfrac{3}{4}$");

Column 10,
Line 57, after "materials," insert -- including the steel slag --;

Column 11,
Lines 7, and 41, after "materials," insert -- including the steel slag --.

Signed and Sealed this

Twenty-ninth Day of June, 2004

JON W. DUDAS
*Acting Director of the United States Patent and Trademark Office*